(12) United States Patent
Brown et al.

(10) Patent No.: US 6,925,514 B1
(45) Date of Patent: Aug. 2, 2005

(54) MULTI-PROTOCOL BUS SYSTEM AND METHOD OF OPERATION THEREOF

(75) Inventors: David A. Brown, Austin, TX (US);
Randy L. Findley, Austin, TX (US);
David P. Sonnier, Austin, TX (US);
Gary D. Thompson, Georgetown, TX (US)

(73) Assignee: Agere Systems Inc., Allentown, PA (US)

( * ) Notice: Subject to any disclaimer, the term of this patent is extended or adjusted under 35 U.S.C. 154(b) by 672 days.

(21) Appl. No.: 09/821,892

(22) Filed: Mar. 30, 2001

(51) Int. Cl.[7] ............................................. G06F 13/42
(52) U.S. Cl. ...................................................... 710/105
(58) Field of Search ............................. 710/11, 9, 105; 711/202, 206, 211

(56) References Cited

U.S. PATENT DOCUMENTS

| 4,156,796 | A | * | 5/1979 | O'Neal et al. ................. 178/3 |
| 4,287,563 | A | * | 9/1981 | Huston, Jr. .................. 710/100 |
| 4,393,461 | A | * | 7/1983 | Holtey et al. ............... 710/106 |
| 5,425,028 | A | * | 6/1995 | Britton et al. ............... 370/389 |
| 5,438,663 | A | * | 8/1995 | Matsumoto et al. ......... 345/520 |
| 5,537,417 | A | * | 7/1996 | Sharma et al. .............. 709/228 |
| 5,715,419 | A | * | 2/1998 | Szczepanek et al. ........ 711/212 |
| 5,835,960 | A | * | 11/1998 | Keene et al. ................ 711/172 |
| 6,119,226 | A | * | 9/2000 | Shiau et al. .................... 713/2 |
| 6,160,213 | A | * | 12/2000 | Arnold et al. ................ 84/615 |
| 6,216,191 | B1 | * | 4/2001 | Britton et al. ............... 710/305 |
| 6,456,628 | B1 | * | 9/2002 | Greim et al. ................ 370/466 |

FOREIGN PATENT DOCUMENTS

DE              3937021 A1 *  5/1991   ............ G06F/13/42

\* cited by examiner

*Primary Examiner*—Paul R. Myers

(57) ABSTRACT

A multi-protocol bus system and a method of operating the same. In one embodiment, the multi-protocol bus system includes a plurality of protocol indicators associated with an address space, each of the plurality of protocol indicators associated with a segment of the address space and configured to indicate a particular bus protocol. The multi-protocol bus system further includes a bus protocol selection subsystem configured to employ control lines to implement one of the particular bus protocols in accordance with a selected one of the protocol indicators based upon an addressed segment of the address space.

7 Claims, 7 Drawing Sheets

MULTI-PROTOCOL BUS SYSTEM AND METHOD OF OPERATION THEREOF

TECHNICAL FIELD OF THE INVENTION

The present invention is directed, in general, to a communications system and, more specifically, to a multi-protocol bus system and method of operating the same.

BACKGROUND OF THE INVENTION

Communications networks are currently undergoing a revolution brought about by the increasing demand for real-time information being delivered to a diversity of locations. Many situations require the ability to transfer large amounts of data across geographical boundaries with increasing speed and accuracy. However, with the increasing size and complexity of the data that is currently being transferred, maintaining the speed and accuracy is becoming increasingly difficult.

Early communications networks resembled a hierarchical star topology. All access from remote sites was channeled back to a central location where a mainframe computer resided. Thus, each transfer of data from one remote site to another, or from one remote site to the central location, had to be processed by the central location. This architecture is very processor-intensive and incurs higher bandwidth utilization for each transfer. This was not a major problem in the mid to late 1980s where fewer remote sites were coupled to the central location. Additionally, many of the remote sites were located in close proximity to the central location. Currently, hundreds of thousands of remote sites are positioned in various locations across assorted continents. Legacy networks of the past are currently unable to provide the data transfer speed and accuracy demanded in the marketplace of today.

In response to this exploding demand, data transfer through networks employing distributed processing has allowed larger packets of information to be accurately and quickly distributed across multiple geographic boundaries. Today, many communication sites have the intelligence and capability to communicate with many other sites, regardless of their location. This is typically accomplished on a peer level, rather than through a centralized topology, although a host computer at the central site can be appraised of what transactions take place and can maintain a database from which management reports are generated and operation issues addressed.

Distributed processing currently allows the centralized site to be relieved of many of the processor-intensive data transfer requirements of the past. This is typically accomplished using a data network, which includes a collection of routers. The routers allow intelligent passing of information and data files between remote sites. However, increased demand and the sophistication required to route current information and data files quickly challenged the capabilities of existing routers. Some efficiencies were obtained by employing new types of processors and devices. When designers added these new types of processors, they had to use the processors and devices that used the same bus protocol architecture. Some attempts were made to use different devices using different bus protocols. However, the implementations typically required complex circuitry that increases the processing time and therefore decreases the throughput of the router. In view of the ever increasing demand for higher transmission speeds this is highly undesirable.

Accordingly, what is needed in the art is a system to overcome the deficiencies of the prior art.

SUMMARY OF THE INVENTION

To address the above-discussed deficiencies of the prior art, the present invention provides a virtual multi-protocol bus system and a method of operating the same. In one embodiment, the multi-protocol bus system includes: (1) a plurality of protocol indicators associated with an address space, each of the plurality of protocol indicators associated with a segment of the address space and configured to indicate a particular bus protocol and (2) a bus protocol selection subsystem configured to employ control lines to implement one of the particular bus protocols in accordance with a selected one of the protocol indicators based upon an addressed segment of the address space.

In another embodiment, the present invention provides a method of operating a multi-protocol bus system that includes: (1) employing a plurality of protocol indicators associated with an address space, each of the plurality of protocol indicators associated with a segment of the address space and indicate a particular bus protocol and (2) employing control lines to implement one of the particular bus protocols in accordance with a selected one of the protocol indicators based upon an addressed segment of the address space.

The present invention also provides, in one embodiment, a system interface processor that includes: (1) a protocol data unit (PDU) receiver that receives PDUs, (2) a protocol data unit (PDU) transmitter that transmits PDUs and (3) a peripheral component interconnect (PCI) interface that receives PDUs from the PDU receiver, transmits PDUs to the PDU transmitter and interfaces with a multi-protocol bus. The PCI interface also includes a multi-protocol bus system having: (1) a plurality of protocol indicators associated with an address space, each of the plurality of protocol indicators associated with a segment of the address space and indicate the particular bus protocol and (2) a bus protocol selection subsystem that employs the control lines to implement one of the particular bus protocols in accordance with a selected one of the protocol indicators based upon an addressed segment of the address space.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
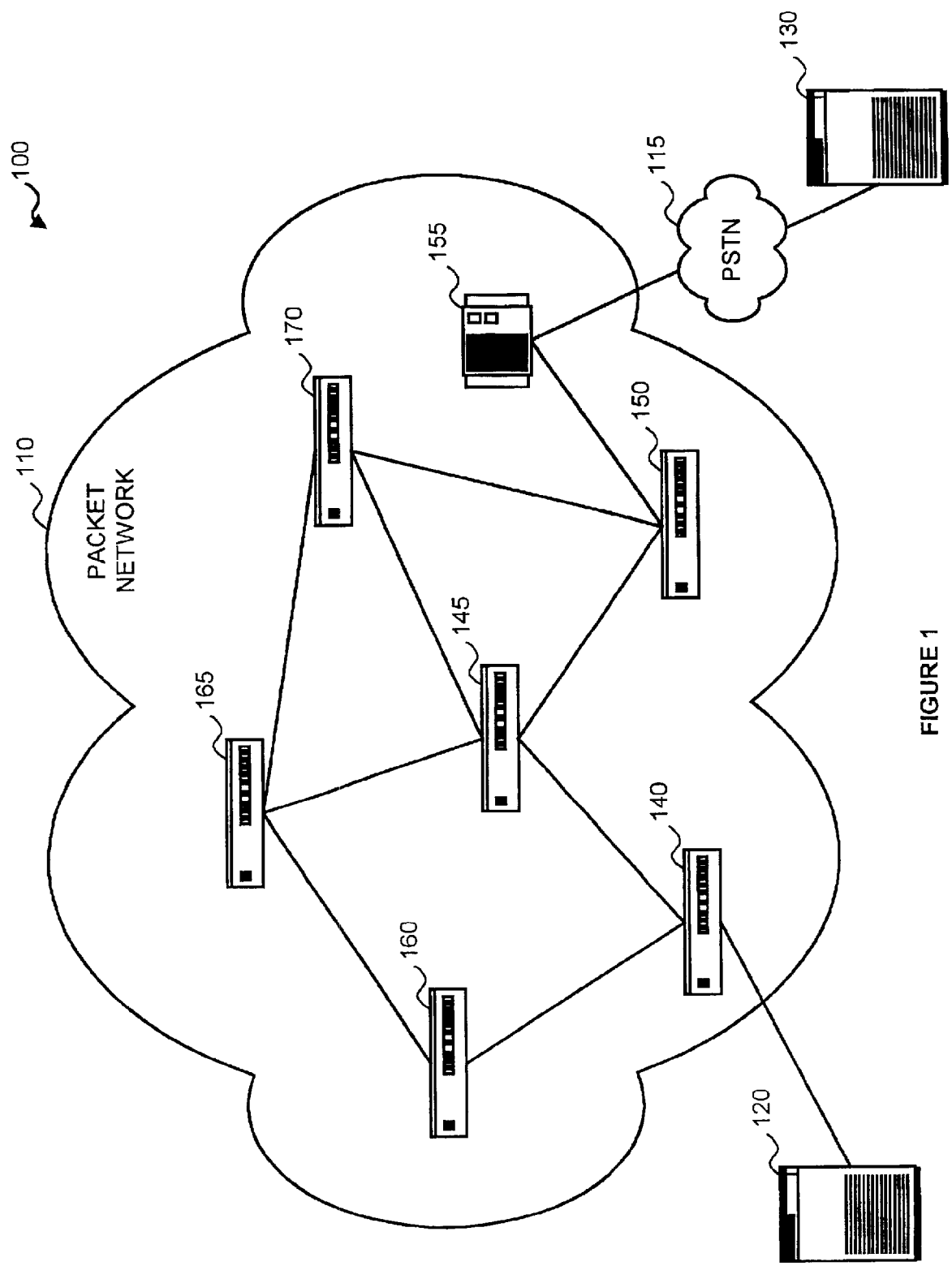
FIG. 1 illustrates a block diagram of an embodiment of a communications network constructed in accordance with the principles of the present invention.

Referring initially to FIG. 1, illustrated is a block diagram of an embodiment of a communications network, generally designated 100, constructed in accordance with the principles of the present invention. The communications network 100 is generally designed to transmit information in the form of a data packet from one point in the network to another point in the network.

As illustrated, the communications network 100 includes a packet network 110, a public switched telephone network (PSTN) 115, a source device 120 and a destination device 130. In the illustrative embodiment shown in FIG. 1, the packet network 110 comprises an Asynchronous Transfer Mode (ATM) network. However, one skilled in the art readily understands that the present invention may use any type of packet network. The packet network 110 includes routers 140, 145, 150, 160, 165, 170 and a gateway 155. One skilled in the pertinent art understands that the packet network 110 may include any number of routers and gateways.

The source device 120 may generate a data packet to be sent to the destination device 130 through the packet network 110. In the illustrated example, the source device 120 initially sends the data packet to the first router 140. The first router 140 then determines from the data packet which router to send the data packet to based upon routing information and network loading. Some information in determining the selection of a next router may include the size of the data packet, loading of the communications link to a router and the destination. In this example, the first router 140 may send the data packet to the second router 145 or fourth router 160.

The data packet traverses from router to router within the packet network 110 until it reaches the gateway 155. In one particular example, the data packet may traverse along a path that includes the first router 140, the fourth router 160, the fifth router 165, the sixth router 170, the third router 150 and finally to the gateway 155. The gateway 155 converts the data packet from the protocol associated with the packet network 110 to a different protocol compatible with the PSTN 115. The gateway 155 then transmits the data packet to the destination device 130 via the PSTN 115. However, in another example, the data packet may traverse along a different path such as the first router 140, the second router 145, the third router 150 and finally to the gateway 155. It is generally desired when choosing a subsequent router, the path the data packet traverses should result in the fastest throughput for the data packet. It should be noted, however, that this path does not always include the least number of routers.

Figure 2:
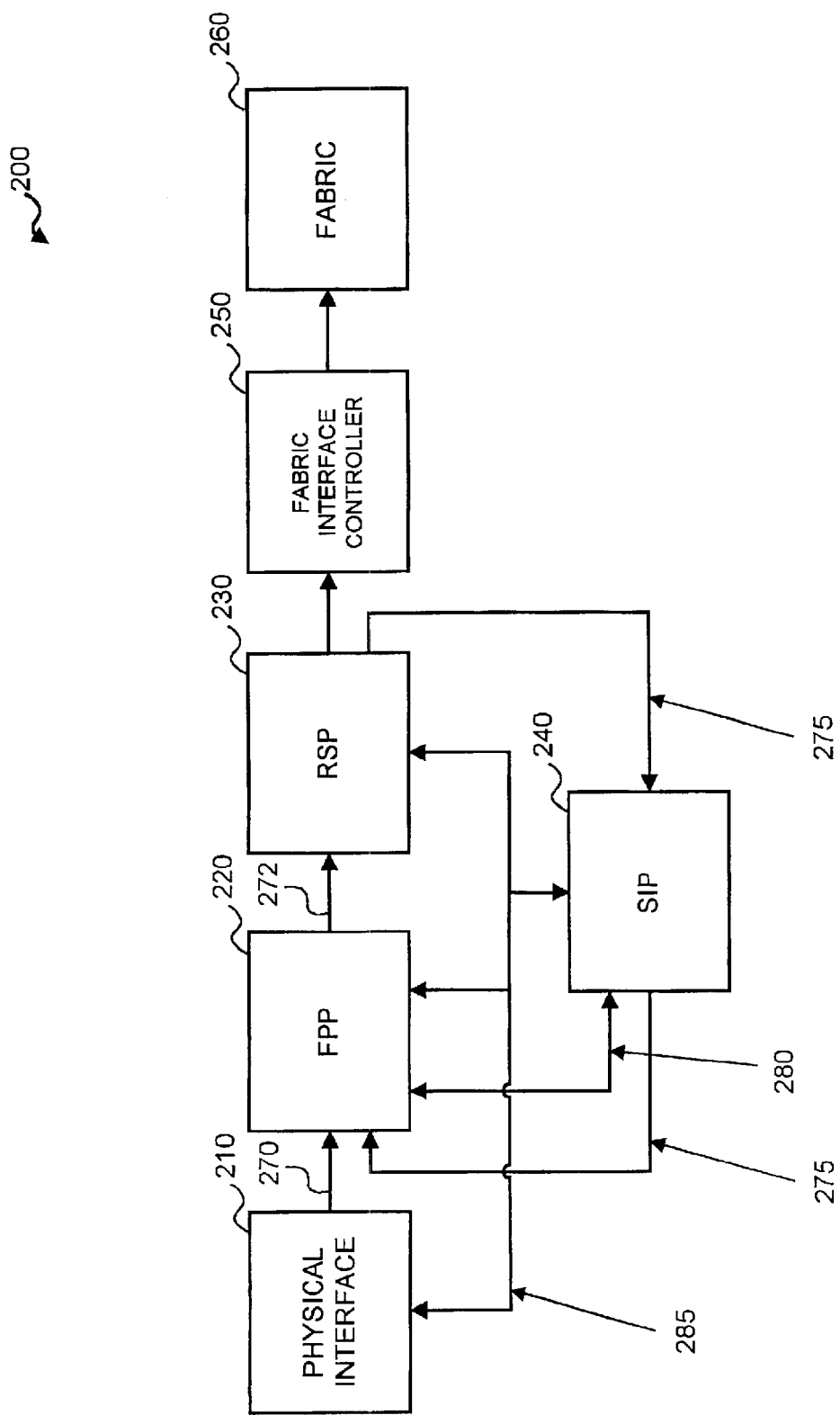
FIG. 2 illustrates a block diagram of an embodiment of a router architecture constructed in accordance with the principles of the present invention.

Turning now to FIG. 2, illustrated is a block diagram of an embodiment of a router architecture, generally designated 200, constructed in accordance with the principles of the present invention. The router architecture 200, in one embodiment, may be employed in any of the routers illustrated in FIG. 1. The router architecture 200 provides a unique hardware and software combination that delivers high-speed processing for multiple communication protocols with full programmability. The unique combination provides the programmability of traditional reduced instruction set computing (RISC) processors with the speed that, until now, only application-specific integrated circuit (ASIC) processors could deliver.

In the embodiment shown in FIG. 2, the router architecture 200 includes a physical interface 210, a fast pattern processor (FPP) 220, a routing switch processor (RSP) 230, and a system interface processor (SIP) 240. The router architecture 200 may also include a fabric interface controller 250 which is coupled to the RSP 230 and a fabric network 260. It should be noted that other components not shown may be included within the router architecture 200 without departing from the scope of the present invention.

The physical interface 210 provides coupling to an external network. In an exemplary embodiment, the physical interface 210 is a POS-PHY/UTOPIA level 3 interface. The FPP 220, in one embodiment, may be coupled to the physical interface 210 and receives a data stream that includes protocol data units from the physical interface 210. The FPP 220 analyzes and classifies the Protocol data units and subsequently concludes processing by outputting packets to the RSP 230.

The FPP 220, in conjunction with a powerful high-level functional programming language (FPL), is capable of implementing complex pattern or signature recognition and operates on the processing blocks containing those signatures. The FPP 220 has the ability to perform pattern analysis on every byte of the payload plus headers of a data stream. The pattern analysis conclusions may then be made available to a system logic or to the RSP 230, allowing processing block manipulation and queuing functions. The FPP 220 and RSP 230 provide a solution for switching and routing. The FPP 220 further provides glueless interfaces to the RSP 230 and the SIP 240 to provide a complete solution for wire-speed processing in next-generation, terabit switches and routers.

As illustrated in FIG. 2, the FPP 220 employs a first communication link 270 to receive the data stream from the physical interface 210. The first communication link 270 may be an industry-standard UTOPIA Level 3/UTOPIA Level 2/POS-PHY Level 3 interface. Additionally, the FPP 220 employs a second communication link 272 to transmit packet and conclusions to the RSP 230. The second communication link 272 may be a POS-PHY Level 3 interface.

The FPP 220 also includes a management path interface (MPI) 275, a function bus interface (FBI) 280 and a configuration bus interface (CBI) 285. The MPI 275 enables the FPP 220 to receive management frames from a local microprocessor. In an exemplary embodiment, this may be handled through the SIP 240. The FBI 280 connects the FPP 220 and the SIP 240, or custom logic in certain situations, for external processing of function calls. The CBI 285 connects the FPP 220 and other devices (e.g., physical interface 210 and RSP 230) to the SIP 240. Other interfaces (not shown), such as memory interfaces, are also well within the scope of the present invention.

The FPP 220 provides an additional benefit in that it is programmable to provide flexibility in optimizing performance for a wide variety of applications and protocols. Because the FPP is a programmable processor rather than a fixed-function ASIC, it can handle new protocols or applications as they are developed as well as new network functions as required. The FPP 220 may also accommodate a variety of search algorithms. These search algorithms may be applied to large lists beneficially.

The RSP 230 is also programmable and works in concert with the FPP 220 to process the protocol data units classified by the FPP 220. The RSP 230 uses the classification information received from the FPP 220 to determine the starting offset and the length of the Protocol data unit payload, which provides the classification conclusion for the Protocol data unit. The classification information may be used to determine the port and the associated RSP 230 selected for the Protocol data unit. The RSP 230 may also receive additional Protocol data unit information passed in the form of flags for further processing.

The RSP 230 also provides programmable traffic management including policies such as random early discard (RED), weighted random early discard (WRED), early packet discard (EPD) and partial packet discard (PPD). The RSP 230 may also provide programmable traffic shaping, including programmable per queue quality of service (QoS) and class of service (CoS) parameters. The QoS parameters include constant bit rate (CBR), unspecified bit rate (UBR), and variable bitrate (VBR). Correspondingly, CoS parameters include fixed priority, round robin, weighted round robin (WRR), weighted fair queuing (WFQ) and guaranteed frame rate (GFR).

Alternatively, the RSP 230 may provide programmable packet modifications, including adding or stripping headers and trailers, rewriting or modifying contents, adding tags and updating checksums and CRCs. The RSP 230 may be programmed using a scripting language with semantics similar to the C language. Such script languages are well known in the art. Also connected to the RSP 230 are the fabric interface controller 250 and the fabric network 260. The fabric interface controller 250 provide the physical interface to the fabric 260, which is typically a communications network.

The SIP 240 allows centralized initialization and configuration of the FPP 220, the RSP 230 and the physical interfaces 210, 250. The SIP 240, in one embodiment, may provide policing, manage state information and provide a peripheral component interconnect (PCI) connection to a host computer. The SIP 240 may be a PayloadPlus™ Agere System Interface commercially available from Agere Systems, Inc.

Figure 3:
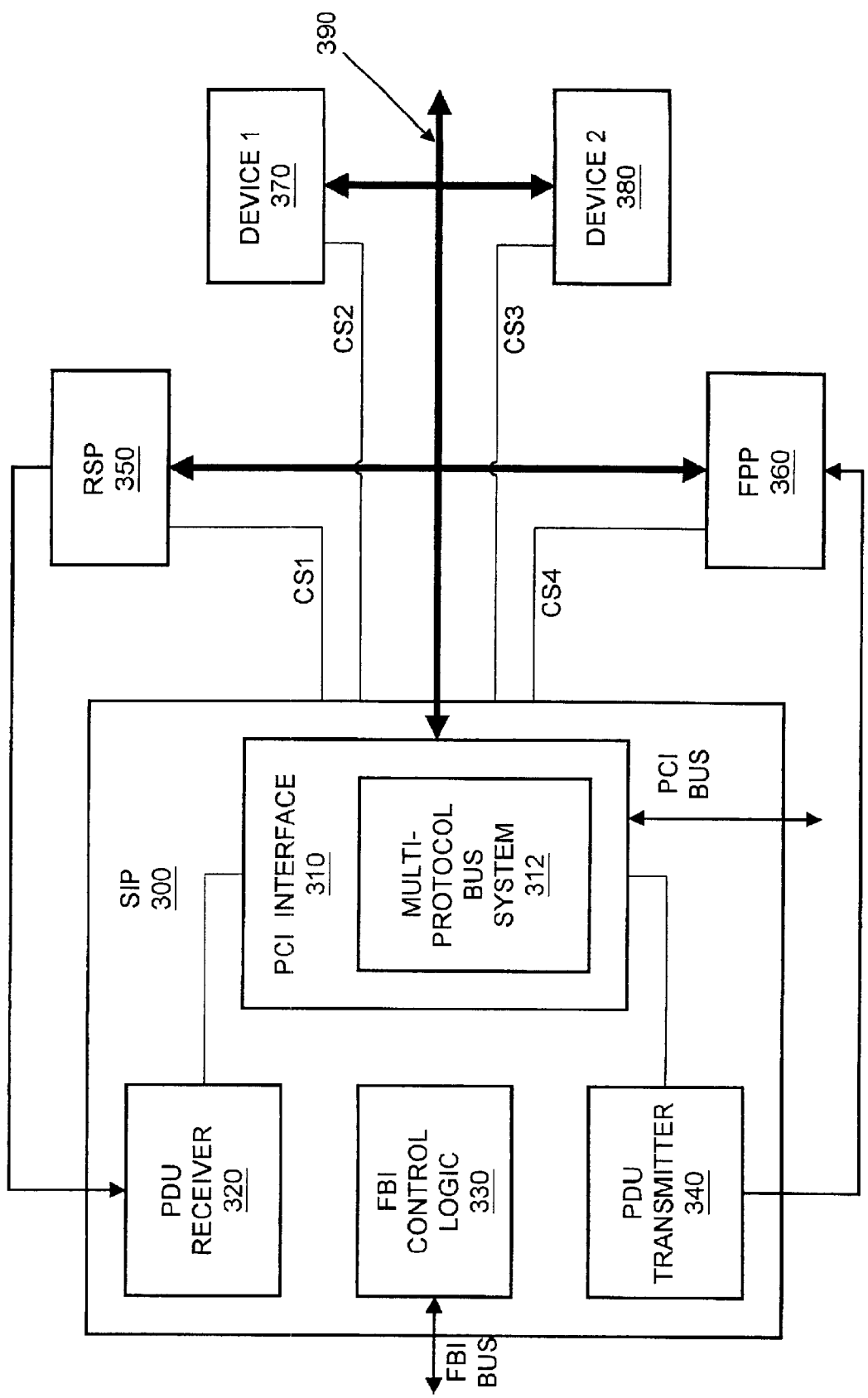
FIG. 3 illustrates a block diagram of an embodiment of a system interface processor constructed in accordance with the principles of the present invention.

Turning now to FIG. 3, illustrated is a block diagram of an embodiment of a system interface processor (SIP), generally designated 300, constructed in accordance with the principles of the present invention. The SIP 300 includes a PCI interface 310, a PDU receiver 320, an FBI control logic 330 and a PDU transmitter 340. The PDU receiver 320 receives PDUs from a routing switch processor (RSP) 350 and sends the PDUs to the PCI interface 310. (See FIG. 2 for a description of an RSP.) The PDU receiver 320 is also configured to appear as a physical layer device to the RSP 350.

For purposes of the present invention, a "protocol data unit" is the underlying message in a specific protocol that may be transmitted via packets over a network. For example, a protocol data unit may be an Internet Protocol ("IP") message that is transmitted over an Asynchronous Transfer Mode ("ATM") network. In an ATM network, the IP message is broken into ATM cells (packets) before transmission over the ATM network. Of course, however, a protocol data unit may be any protocol message transmitted over a network and a packet may be a portion of the protocol data unit or the entire protocol data unit. The phrase "configured to" is included to mean that the device, the system or the subsystem includes the necessary software, hardware, firmware or a combination thereof to accomplish the stated task.

The PCI interface 310 is configured to receive PDUs from the PDU receiver 320 and transmit PDUs to the PDU transmitter 340. The PCI interface 310 is also configured to interface with a host processor (not shown) through a PCI bus to send and receive data, commands, routing table updates and other type of information associated with a router. Additionally, the PCI interface 310 is coupled to a multi-protocol bus 390 and chip select lines CS1, CS2, CS3, CS4. The multi-protocol bus 390 is configured to accommodate different bus protocols, such as a Motorola-style bus protocol and an Intel-style bus protocol. In one embodiment, the multi-protocol bus 390 is the CBI 285 of FIG. 2.

Coupled to the multi-protocol bus 390, in one embodiment, is the RSP 350, an FPP 360, a first device 370 and a second device 380. (See FIG. 2 for a description of an FPP.) Each of the devices 350, 360, 370, 380 may communicate using one bus protocol, different bus protocols or a combination thereof and access to the multi-protocol bus 390, by the devices 350, 360, 370, 380, is controlled by the chip select lines CS1, CS2, CS3, CS4 respectively. The first device 370 may employ a Motorola-style bus protocol and the second device 380 may employ an Intel-style bus protocol, both of which may communicate via the multi-protocol bus 390 in their respective bus protocol.

In the illustrated embodiment, the PCI interface 310 also includes a multi-protocol bus system 312 that is configured to dynamically implement a particular bus protocol on the multi-protocol bus 390 when communicating with or controlling the devices 350, 360, 370, 380. The multi-protocol bus system 312 is further configured to employ segments of an address space, such as four kilobyte segments. In one embodiment, the address space is a thirty-two kilobyte PCI address space where each of the devices 350, 360, 370, 380 are associated with a particular segment of the address space. To communicate with one of the devices 350, 360, 370, 380, a processor, such as the PCI interface 310, writes to or reads from that device's particular address space. The multi-protocol bus system 312 determines which particular bus protocol is associated with that address space and implements that bus protocol. Then, the processor can communicate with that device. Thus, the present invention advantageously provides a bus protocol abstraction layer to a processor and allows different devices employing different bus protocols to be used in the same system.

The SIP 300 also includes the PDU transmitter 340 that is configured to receive PDUs from the PCI interface 310 and transmit the PDUs to the FPP 360. Additionally, the SIP 300 may include the FBI control logic 330 that is configured to receive and transmit function calls via an FBI bus. The function calls may be used to cause other processors to perform a specific function or may cause the SIP 300 to perform a function. In one embodiment, the SIP 300 may send function calls to the FPP 360 in addition to the PDUs sent by the PDU transmitter 340.

One skilled in the pertinent art should know that the present invention is not limited to being employed within a PCI interface 310. Nor is the present invention limited to being employed within a SIP 300. In other embodiments, the present invention may be embodied within any system that employs a multiple protocol bus architecture. Additionally, the present invention may be configured to communicate with and control any number of devices coupled to the SIP 300 and control any number of chip select lines.

Figure 4:
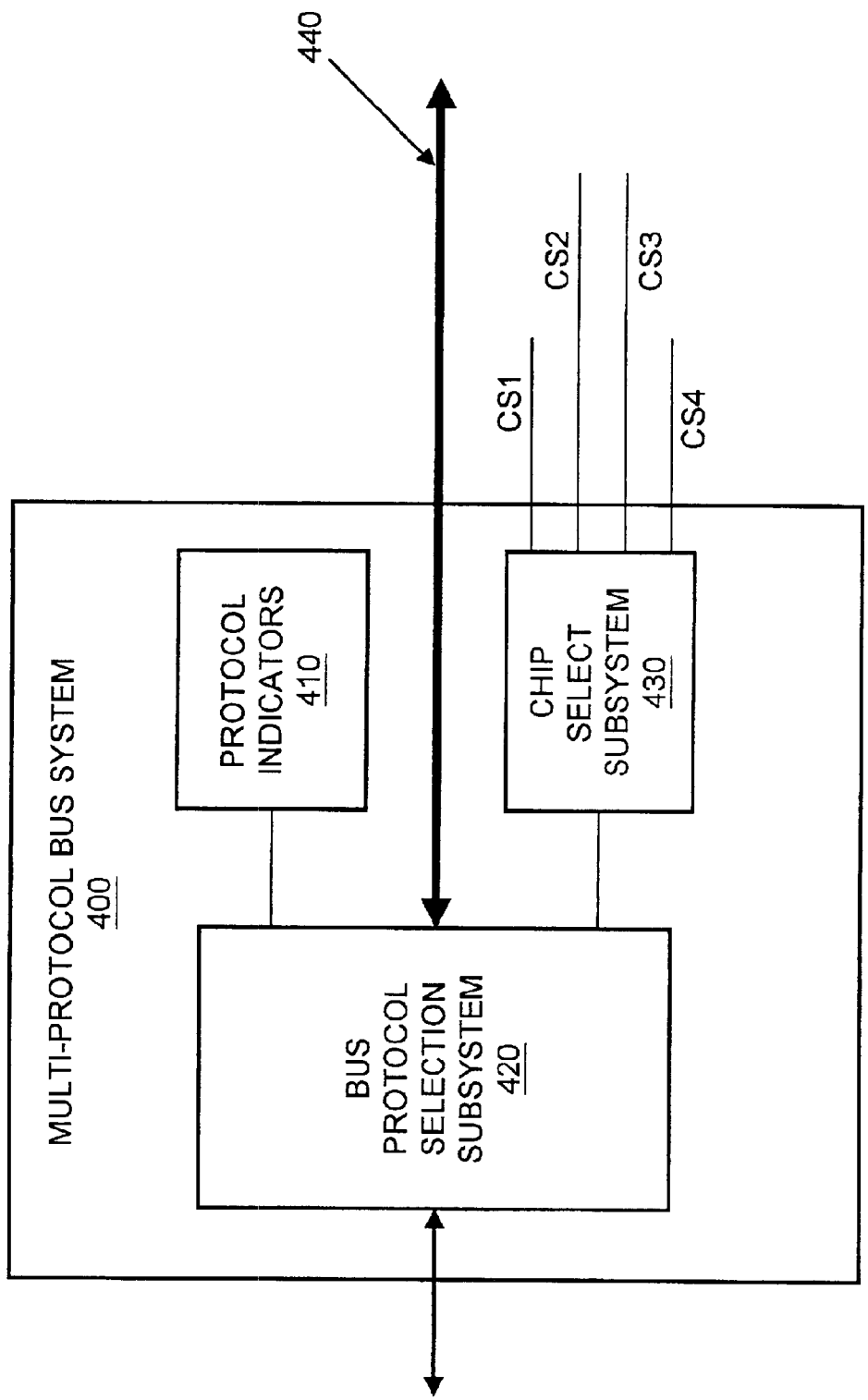
FIG. 4 illustrates a block diagram of an embodiment of a multi-protocol bus system constructed in accordance with the principles of the present invention.

Turning now to FIG. 4, illustrated is a block diagram of an embodiment of a multi-protocol bus system, generally designated 400, constructed in accordance with the principles of the present invention. The multi-protocol bus system 400 can dynamically implement different bus protocols on a multi-protocol bus 440 to allow devices employing different bus protocols to be used in the same system. In the illustrated embodiment, the multi-protocol bus system 400 includes protocol indicators 410 and a bus protocol selection subsystem 420. The protocol indicators 410 are associated with an address space. The address space, in one embodiment, is a thirty-two kilobyte PCI address space. Of course, however, the present invention is not limited to any one particular type of address space. Other embodiments of the present invention may employ any type of or size of address space.

Each of the protocol indicators 410 are generally associated with a segment of the address space and are configured to indicate a particular bus protocol that will be used for that segment of address space. For example, the address space may be divided into four kilobyte segments and each of the segments have an associated protocol indicator. Each of the four kilobyte segments is also associated with (or mapped to) an external device having a particular bus protocol. The protocol indicator for a particular segment would indicate the bus protocol to be used to communicate with the associated external device. For example, if the first segment is 0-0FFF Hex and the associated external device uses a Motorola-style bus protocol, the protocol indicator associated with the first segment would indicate that the Motorola-style bus protocol is to be used for this device. If the second segment is 1000-1FFF Hex and the associated external device uses an Intel-style bus protocol, the associated protocol indicator would indicate that the Intel-style bus protocol is to be used for that device.

Associated with the protocol indicators 410 is the bus protocol selection subsystem 420. The bus protocol selection subsystem 420 receives access requests for a particular segment of the address space. The access requests may be a read request, write request or any type of request that addresses a particular segment of the address space. The bus protocol selection subsystem 420 then selects the protocol indicator associated with that particular segment of address space from the protocol indicators 410. The bus protocol selection subsystem 420 then determines the bus protocol to implement based upon the selected protocol indicator.

Once the bus protocol has been determined, the bus protocol selection subsystem 420 employs control lines to implement that particular bus protocol. In the illustrated embodiment, the control lines are included in the multi-protocol bus 440 along with address lines and data lines. The control lines, in one embodiment, may be selected from an address latch enable control line, a chip select control line, a read data strobe control line, a write data strobe control line, a ready control line, a read/write select control line, a data strobe control line, and a data acknowledge control line. In a related embodiment, a control line may be one type of control signal for one particular bus protocol and the same control line may be a different type of control signal for a different bus protocol. The particular bus protocol may be selected from a Motorola-style bus protocol and an Intel-style bus protocol. Of course, however, the present invention is not limited to the above listed control lines and bus protocols. Other embodiments of the present invention may employ additional or different control lines and bus protocols. See FIGS. 6A–6D for exemplary timing diagrams employing different control lines for different bus protocols.

In the illustrated embodiment, the multi-protocol bus system 400 also includes a chip select subsystem 430 configured to provide a chip selection signal to an external device based upon the addressed segment of the address space. The bus protocol selection subsystem 420 sends a control signal to the chip select subsystem 430 to assert a chip selection signal to an external device associated with a particular segment of the address space. The selected external device may then access the multi-protocol bus 440 using its bus protocol. The chip select subsystem 430 may also cause the other chip selection signals to be held at an inactive level to prevent other devices from accessing the multi-protocol bus 440.

The chip select subsystem 430 may employ individual chip selection signals CS1, CS2, CS3, CS4 to select external devices. In another embodiment, the chip select subsystem 430 may employ a chip select bus to provide the chip selection signals. Additionally, the chip select subsystem 430 may include additional circuitry to provide multiple chip selection signals. Of course, however, the present invention is not limited to only four chip selection signals. Other embodiments of the present invention may have any number of chip selection signals.

One skilled in the pertinent art should know that the present invention is not limited to subsystems and circuitry described above. Nor is the present invention limited to the method in which a particular bus protocol is implemented. In other embodiments, the present invention may employ additional or different methods of implementing multiple bus protocols on the same bus architecture.

Figure 5:
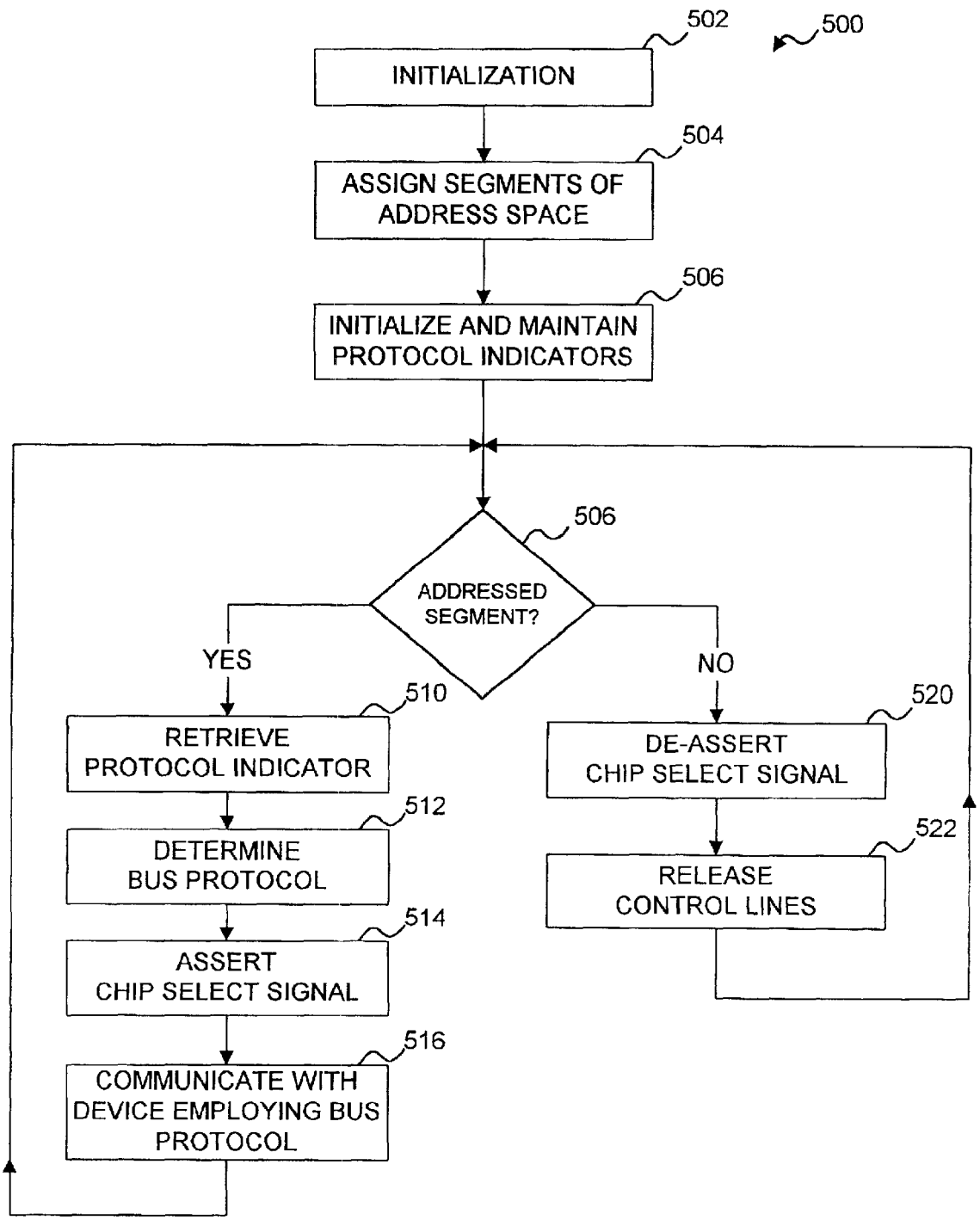
FIG. 5 illustrates a flow diagram of an embodiment of a method of operating a multi-protocol bus system constructed in accordance with the principles of the present invention.

Turning now to FIG. 5, illustrated is a flow diagram of an embodiment of a method, generally designated 500, of operating a multi-protocol bus system constructed in accordance with the principles of the present invention. In FIG. 5, the multi-protocol bus system first performs initialization in a step 502.

After initialization, the multi-protocol bus system segments the address space and assigns the segments of the address space to external devices in a step 504. The multi-protocol bus system then initializes and maintains (e.g., updates) the protocol indicators in a step 506. The initialization and maintenance process may include associating each of the protocol indicators to a particular segment of the address space and storing an indication of the bus protocol to be employed when communicating with the associated external device.

Next, the multi-protocol bus system determines if a segment of the address space associated with an external device has been addressed in a decisional step 506. If a segment was addressed, the multi-protocol bus system retrieves the protocol indicator associated with the addressed segment in a step 510. The multi-protocol bus system then determines the bus protocol to implement from the protocol indicator in a step 512.

Next, the multi-protocol bus system may assert a chip select signal to the external device associated with that particular segment of address space in a step 514. In a related embodiment, the multi-protocol bus system causes the other chip select signals associated with the other devices to be held at an inactive level to prevent the other devices from accessing the multi-protocol bus.

Then, the multi-protocol bus system communicates with the device employing the device's bus protocol on a multi-protocol bus in a step 516. To communicate in a particular bus protocol, the multi-protocol bus system employs control lines to implement the particular bus protocol on the multi-protocol bus. In one embodiment, the control lines are selected from an address latch enable control line, a chip select control line, a read data strobe control line, a write data strobe control line, a ready control line, a read/write select control line, a data strobe control line, and a data acknowledge control line. In a related embodiment, the control lines may be one type of control signal for one bus protocol and the same control lines be a different type of control signal for a different bus protocol. Of course, however, the present invention is not limited to the above control lines. In other embodiments, the present invention may employ any number of the control lines and may have additional or different control lines. Then, the multi-protocol bus system returns to process the next addressed segment in the decisional step 506.

If the multi-protocol bus system determines that a segment of the address space was not addressed in the decisional step 506, the multi-protocol bus system then de-asserts the previously asserted chip select signal in a step 520. Then, the multi-protocol bus system releases the control lines used to implement the particular bus protocol in a step 522. The multi-protocol bus system then returns to process the next addressed segment in the decisional step 506. Other embodiments of the present invention may have additional or fewer steps than described above.

Figure 6A:
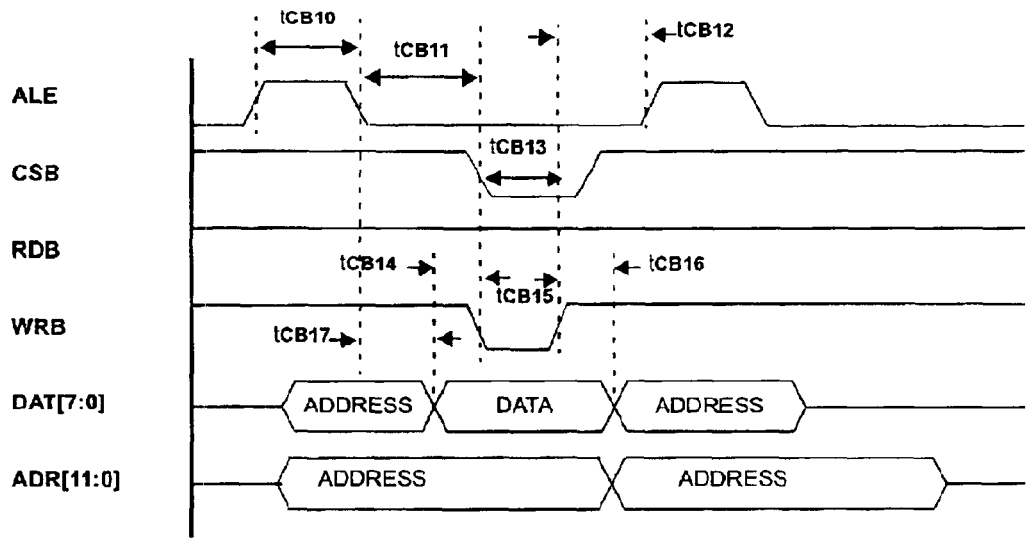
FIG. 6A illustrates a timing diagram of a write cycle for a multi-protocol bus configured for an Intel-style bus protocol constructed in accordance with the principles of the present invention.

Turning now to FIG. 6A, illustrated is a timing diagram of a write cycle for a multi-protocol bus configured for an Intel-style bus protocol constructed in accordance with the principles of the present invention. FIG. 6A illustrates the control lines employed to implement the Intel-style bus protocol for a write cycle on a multi-protocol bus. Table 6.1 illustrates the timing parameters for the control signals, address lines and data lines. One skilled in the pertinent art should know that the present invention is not limited to the times specified in Table 6.1.

TABLE 6.1

| | | CLK DIV = 0 | | | | CLK DIV = 1 | | | | |
| --- | --- | --- | --- | --- | --- | --- | --- | --- | --- | --- |
| | | PCI Bus Clock = 66 MHz | | PCI Bus Clock = 33 MHz | | PCI Bus Clock = 66 MHz | | PCI Bus Clock = 33 MHz | | |
| Symbol | Parameter | Min | Max | Min | Max | Min | Max | Min | Max | Unit |
| tCB10 | Latch enable | 12 | ** | 27 | ** | 27 | ** | 57 | ** | ns |
| tCB11 | Latch deasserted to write asserted | 12 | ** | 27 | ** | 12 | ** | 27 | ** | ns |
| tCB12 | Write deasserted to latch enable | 12 | ** | 27 | ** | 27 | ** | 57 | ** | ns |
| tCB13 | Chip select for write operation | 19.5 + (#waits × Tcyc) | ** | 42.0 + (#waits × Tcyc) | ** | 34.5 + (#waits × Tcyc) | ** | 72.0 + (#waits × Tcyc) | ** | ns |
| tCB14 | Data setup to write asserted | 0 | ** | 0 ns | ** | 0 | ** | 0 | ** | ns |
| tCB15 | Write enable | 12.0 + (#waits × Tcyc) | ** | 27.0 + (#waits × Tcyc) | ** | 27.0 + (#waits × Tcyc) | ** | 57.0 + (#waits × Tcyc) | ** | ns |
| tCB16 | Write deasserted to data released | 12 | ** | 27 | ** | 27 | ** | 57 | ** | ns |
| tCB17 | Latch deasserted to read asserted | 12 | ** | 27 | ** | 12 | ** | 27 | ** | ns |
| tCB18 | Chip select for read operation | 19.5 + (#waits × Tcyc) | ** | 42.0 + (#waits × Tcyc) | ** | 34.5 + (#waits × Tcyc) | ** | 72.0 + (#waits × Tcyc) | ** | ns |
| tCB19 | Read enable | 12.0 + (#waits × Tcyc) | ** | 27.0 + (#waits × Tcyc) | ** | 27.0 + (#waits × Tcyc) | ** | 57.0 + (#waits × Tcyc) | ** | ns |
| tCB20 | Latch deasserted to address released | 5 | ** | 5 | ** | 5 | ** | 5 | ** | ns |
| tCB21 | Read data valid to read deasserted | 10 | ** | 10 | ** | 10 | ** | 10 | ** | ns |
| tCB22 | Read hold after read deasserted | 5 | ** | 5 | ** | 5 | ** | 5 | ** | ns |

Figure 6B:
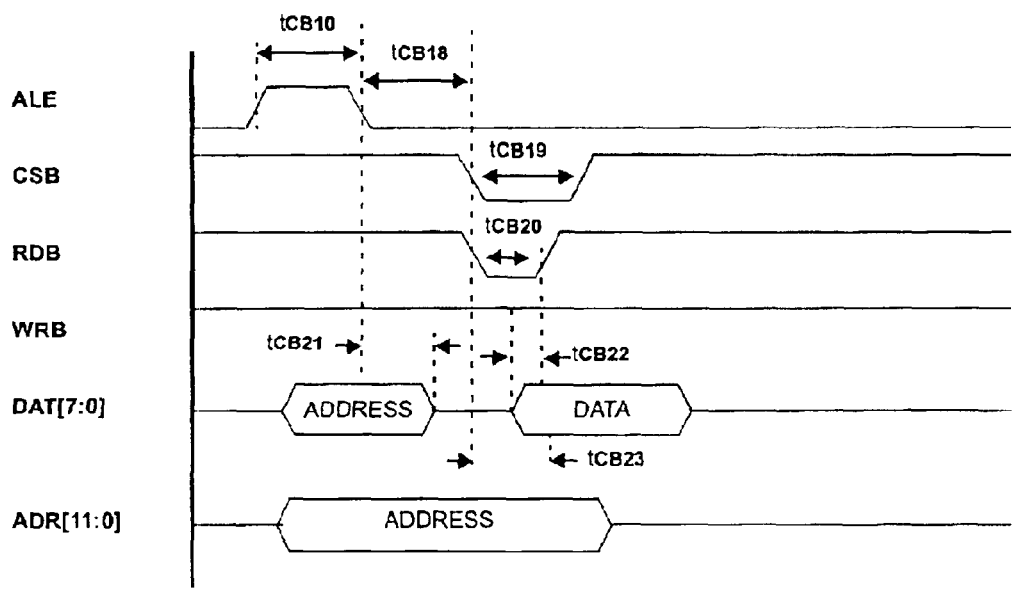
FIG. 6B illustrates a timing diagram of a read cycle for a multi-protocol bus configured for an Intel-style bus protocol constructed in accordance with the principles of the present invention.

Turning now to FIG. 6B, illustrated is a timing diagram of a read cycle for a multi-protocol bus configured for an Intel-style bus protocol constructed in accordance with the principles of the present invention. FIG. 6B illustrates the control lines employed to implement the Intel-style bus protocol for a read cycle on a multi-protocol bus. Table 6.1 illustrates the timing parameters for the control signals, address lines and data lines. One skilled in the pertinent art should know that the present invention is not limited to the times specified in Table 6.1.

Figure 6C:
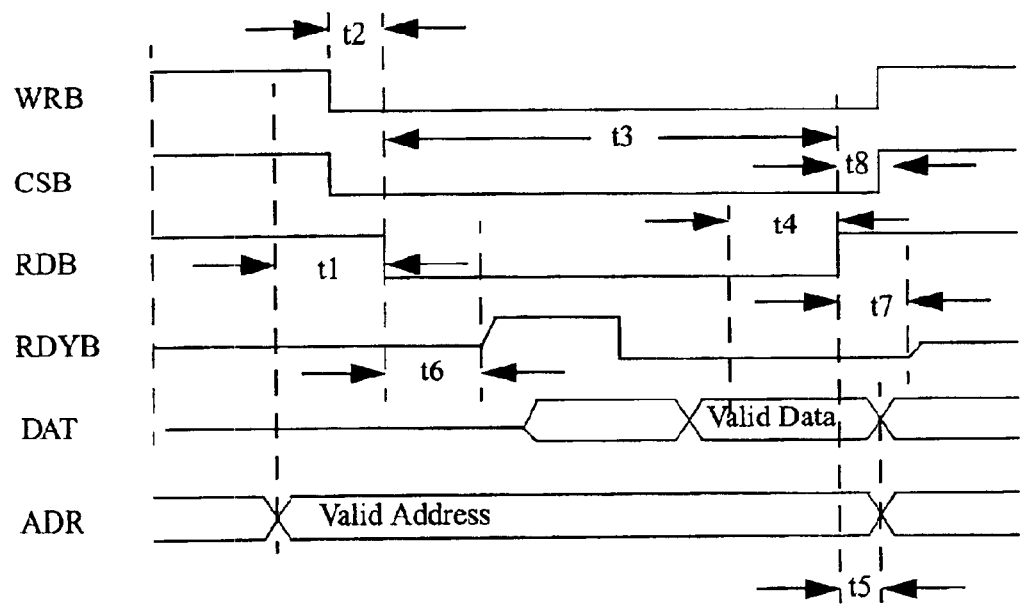
FIG. 6C illustrates a timing diagram of a write cycle for a multi-protocol bus configured for a Motorola-style bus protocol constructed in accordance with the principles of the present invention.

Turning now to FIG. 6C, illustrated is a timing diagram of a write cycle for a multi-protocol bus configured for a Motorola-style bus protocol constructed in accordance with the principles of the present invention. FIG. 6C illustrates the control lines employed to implement the Motorola-style bus protocol for a write cycle on a multi-protocol bus. Table 6.2 illustrates the timing parameters for the control signals, address lines and data lines. One skilled in the pertinent art should know that the present invention is not limited to the times specified in Table 6.2.

TABLE 6.2

| Symbol | Parameter | Min | Max | Unit |
|---|---|---|---|---|
| t1 | ADR setup to RDB assertion | 10.0 | — | ns |
| t2 | CSB, WRB setup to RDB assertion | 5.0 | — | ns |
| t3 | RDB pulse width | 50.0 | — | ns |
| t4 | DAT setup to RDB deassertion | 15.0 | — | ns |
| t5 | ADR, DAT hold from RDB deassertion | 4.0 | — | ns |
| t6 | RDYB valid from RDB assertion | — | 15.0 | ns |
| t7 | RDYB tri-state from RDB deassertion | — | 10.0 | ns |
| t7a | RDYB tri-state from CSB deassertion | — | 10.0 | ns |
| t8 | CSB hold from RDB deassertion | 0.0 | — | ns |

Figure 6D:
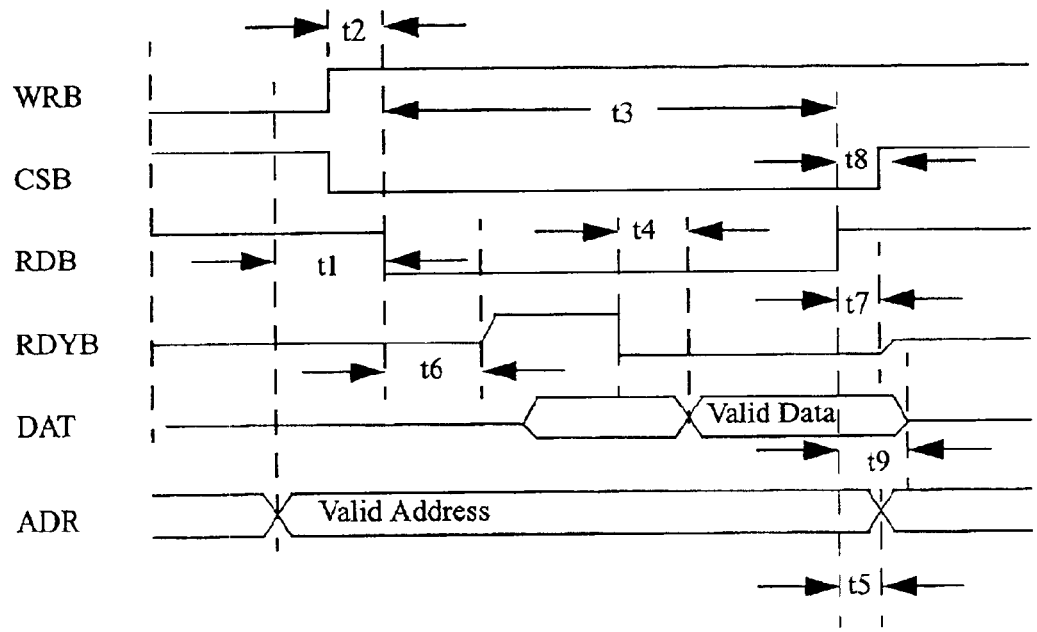
FIG. 6D illustrates a timing diagram of a read cycle for a multi-protocol bus configured for a Motorola-style bus protocol constructed in accordance with the principles of the present invention.

Turning now to FIG. 6D, illustrated is a timing diagram of a read cycle for a multi-protocol bus configured for a Motorola-style bus protocol constructed in accordance with the principles of the present invention. FIG. 6D illustrates the control lines employed to implement the Motorola-style bus protocol for a read cycle on a multi-protocol bus. Table 6.3 illustrates the timing parameters for the control signals, address lines and data lines. One skilled in the pertinent art should know that the present invention is not limited to the times specified in Table 6.3.

TABLE 6.3

| Symbol | Parameter | Min | Max | Unit |
|---|---|---|---|---|
| t1 | ADR setup to RDB assertion | 10.0 | — | ns |
| t2 | CSB, WRB setup to RDB assertion | 5.0 | — | ns |
| t3 | RDB pulse width | 50.0 | — | ns |
| t4 | DAT valid from RDYB assertion | — | 10.0 | ns |
| t5 | ADR hold from RDB deassertion | 4.0 | — | ns |
| t6 | RDYB valid from RDB assertion | — | 15.0 | ns |
| t7 | RDYB tri-state from RDB deassertion | — | 10.0 | ns |
| t7a | RDYB tri-state from CSB deassertion | — | 10.0 | ns |
| t8 | CSB hold from RDB deassertion | 0 | — | ns |
| t9 | DAT tri-state from RDB deassertion | — | 10.0 | ns |
| t9a | DAT tri-state from CSB deassertion | — | 10.0 | ns |

Although the present invention has been described in detail, those skilled in the art should understand that they can make various changes, substitutions and alterations herein without departing from the spirit and scope of the invention in its broadest form.

What is claimed is:

1. A system interface processor, comprising:
   a protocol data unit (PDU) receiver that receives PDUs;
   a protocol data unit (PDU) transmitter that transmits PDUs; and
   a peripheral component interconnect (PCI) interface that receives PDUs from said PDU receiver, transmits PDUs to said PDU transmitter and interfaces with a multi-protocol bus, said PCI interface including a multi-protocol bus system, having:
      a plurality of protocol indicators associated with an address space, each of said plurality of protocol indicators associated with a segment of said address space and indicate a particular bus protocol; and
      a bus protocol selection subsystem that employs control lines to implement one of said particular bus protocols in accordance with a selected one of said protocol indicators based upon an addressed segment of said address space.

2. The system interface processor as recited in claim 1 wherein said multi-protocol bus system further includes a chip selection subsystem that provides a chip selection signal to an external device based upon said addressed segment of said address space.

3. The system interface processor as recited in claim 2 wherein said external device is selected from the group consisting of:
   a fast pattern processor,
   a routing switch processor,
   a Motorola-style bus architecture device, and
   an Intel-style bus architecture device.

4. The system interface processor as recited in claim 1 wherein said particular bus protocol is selected from the group consisting of:
   a Motorola-style bus protocol, and
   an Intel-style bus protocol.

5. The system interface processor as recited in claim 1 wherein said control lines are selected from the group consisting of:
   an address latch enable control line,
   a chip select control line,
   a read control line,
   a write control line,
   a ready control line,
   a read/write control line,
   a data strobe control line, and
   a data acknowledge control line.

6. The system interface processor as recited in claim 1 wherein each segment of said address space is four kilobytes.

7. The system interface processor as recited in claim 1 wherein said address space is a peripheral component interconnect (PCI) address space of thirty-two kilobytes.

* * * * *